DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 10

T920,012

METHOD FOR PRODUCING AN IMPROVED COFFEE FLAVOR

Richard A. Pfluger, Maplewood, Howard J. Bowden, Westwood, and Andrew J. Perla, Nutley, N.J.

Continuation of abandoned application Ser. No. 161,969, July 12, 1971. This application July 11, 1973, Ser. No. 378,088

Int. Cl. A23f *1/08*

U.S. Cl. 426—432

No Drawing. 13 Pages Specification

A method for producing an improved soluble coffee product which comprises splitting the extract draw off stream from a coffee percolation unit into two batches, one batch containing higher quality and higher concentration extract than the second batch containing lower quality and lower concentration extract. The second batch is evaporatively concentrated within a continuous evaporator with a uniform residence time of less than about 30 seconds and added to the first batch. The combined extracts are dried to give a soluble coffee product which does not produce significant off-flavors.